United States Patent
Corbin et al.

(10) Patent No.: US 11,028,303 B2
(45) Date of Patent: Jun. 8, 2021

(54) SODIUM-TIN AND SODIUM-TIN-LEAD COOLANTS

(71) Applicant: TerraPower, LLC, Bellevue, WA (US)

(72) Inventors: Robert A. Corbin, North Bend, WA (US); Kevin Kramer, Redmond, WA (US); Christopher M. Regan, Seattle, WA (US); James M. Vollmer, Kirkland, WA (US)

(73) Assignee: TerraPower, LLC, Bellevue, WA (US)

( * ) Notice: Subject to any disclaimer, the term of this patent is extended or adjusted under 35 U.S.C. 154(b) by 120 days.

(21) Appl. No.: 16/195,180

(22) Filed: Nov. 19, 2018

(65) Prior Publication Data

US 2019/0153285 A1  May 23, 2019

Related U.S. Application Data

(60) Provisional application No. 62/588,686, filed on Nov. 20, 2017.

(51) Int. Cl.

| | |
|---|---|
| *C09K 5/10* | (2006.01) |
| *C09K 5/16* | (2006.01) |
| *C22C 24/00* | (2006.01) |
| *C09K 5/12* | (2006.01) |
| *G21C 15/28* | (2006.01) |
| *G21C 1/02* | (2006.01) |

(52) U.S. Cl.
CPC .............. *C09K 5/10* (2013.01); *C09K 5/12* (2013.01); *C09K 5/16* (2013.01); *C22C 24/00* (2013.01); *G21C 1/02* (2013.01); *G21C 15/28* (2013.01)

(58) Field of Classification Search
CPC .... C09K 5/10; C09K 5/12; C09K 5/16; C22C 24/00; G21C 15/28; G21C 1/02
See application file for complete search history.

(56) References Cited

U.S. PATENT DOCUMENTS

| | | | | |
|---|---|---|---|---|
| 3,169,117 A | * | 2/1965 | Dickinson | G21C 1/03 252/640 |
| 3,173,783 A | * | 3/1965 | Stern | C22C 24/00 420/400 |
| 5,168,020 A | * | 12/1992 | Jow | H01M 4/364 429/217 |
| 8,638,901 B2 | * | 1/2014 | Lahoda | G21C 1/03 376/396 |
| 9,384,862 B2 | * | 7/2016 | Dooies | G21D 3/08 |
| 2012/0201342 A1 | | 8/2012 | Thierry | |
| 2017/0162283 A1 | * | 6/2017 | Loewen | F04B 17/00 |

FOREIGN PATENT DOCUMENTS

| | | | | |
|---|---|---|---|---|
| GB | 930600 A | * | 7/1963 | ............... G21C 3/52 |
| JP | S5037370 B1 | * | 12/1975 | ............... H01M 4/40 |
| JP | 2014175243 A | * | 9/2014 | |
| WO | 2015/021403 A1 | | 2/2015 | |
| WO | WO-2015021403 A1 | * | 2/2015 | ............... G21B 1/13 |

OTHER PUBLICATIONS

Alblas et al. ("Structure of liquid Na—Sn alloys," J. Phys. F: Met. Phys., 13, pp. 2465-2477). (Year: 1983).*
Sangsteretal. ("The Na—Sn (Sodium-Tin) System," Journal of Phase Equilibria, vol. 19, No. 1, Section II: Phase Diagram Evaluations, pp. 76-81). (Year: 1998).*
English machine translation of Yui et al. (JP 2014-175243 A). (Year: 2014).*
International Preliminary Report on Patentability in International Application PCT/US2018/061838, dated Jun. 4, 2020, 10 pages.
Alekseev et al., Eutectic Na—Ti and Pb—Mg alloys as liquid-metal coolants for fast nuclear reactors, Computational Methods and Experimental Measurements XVII, WIT Transactions on Modelling and Simulation, vol. 59, 2015.
PCT International Search Report and Written Opinion in International Application PCT/US2018/061838, dated Feb. 4, 2019, 12 pages.
Alblas, B.P. et al.,"Structure of liquid Na—Sn alloys", Journal of Physics F. Metal Physics, Institute of Physics Publishing, Bristol, GB, vol. 13, No. 12, Dec. 1, 1983 (Dec. 1, 1983), pp. 2465-2477.
Stillwell, Charles W., et al., "Sodium-Lead Alloys. The Structure of the Compound Known as Na 4 Pb", Journal of the American Chemical Society, vol. 55, No. 1, Jan. 1, 1933 (Jan. 1, 1933), pp. 127-129.
Jolodosky, Alejandra et al., "Characterization of Tritium Breeding Ratio and Energy Multiplication Factor of Lithium-based Ternary in IFE Blankets", Conference Paper, Symposium on Fusion Engineering, Austin, TX, May 31, 2015 through Jun. 4, 2015, Jun. 15, 2015, Research Gate, 8 pages.
Jolodosky, Alejandra et al., "Neutronics and activation analysis of lithium-based ternary alloys in IFE blankets", Fusion Engineering and Design 107 (2016), pp. 1-12.
Jolodosky, Alejandra et al., "Activation Analysis of Lithium-based Ternary Alloys in IFE Blankets", Transactions of the American Nuclear Society, vol. 113, Washington D.C, Nov. 8-12, 2015, 5 pages.

* cited by examiner

*Primary Examiner* — Matthew R Diaz (57) ABSTRACT

Sodium-tin and sodium-tin-lead compositions have been identified and created that exhibit better reactivity characteristics (i.e., are less reactive) than sodium metal under the same conditions, making these compositions safer alternatives to sodium metal for use as a coolant. These compositions include compositions having at least 90% sodium (Na), from 0-10% lead (Pb) and the balance being tin (Sn).

4 Claims, 14 Drawing Sheets

SODIUM-TIN AND SODIUM-TIN-LEAD COOLANTS

CROSS-REFERENCE TO RELATED APPLICATIONS

The present application claims the benefit of U.S. Provisional Patent Application No. 62/588,686, titled "SODIUM-LEAD-TIN COOLANT", filed Nov. 20, 2017, which application is hereby incorporated by reference herein.

INTRODUCTION

Sodium metal has been used as a coolant in industrial processes and in power generation including in nuclear reactors. Sodium metal has a relatively low melting point of about 98° C. and a good thermal conductivity making it suitable for use as a heat transfer fluid. However, sodium metal has several well-known drawbacks, particularly that it is highly reactive with water at any temperature and highly reactive with air at elevated temperature making it challenging to work with and expensive to handle.

BRIEF DESCRIPTION OF THE DRAWINGS

The following drawing figures, which form a part of this application, are illustrative of described technology and are not meant to limit the scope of the invention as claimed in any manner, which scope shall be based on the claims appended hereto.

SODIUM-TIN AND SODIUM-TIN-LEAD COOLANTS

Sodium-tin and sodium-tin-lead compositions have been identified and created that exhibit better reactivity characteristics (i.e., are less reactive) than sodium metal under the same conditions, making these compositions safer alternatives to sodium metal for use as a coolant. These compositions include compositions having at least 90% sodium (Na), from 0-10% lead (Pb) and the balance being tin (Sn).

DETAILED DESCRIPTION

Before the sodium-tin coolant compositions are disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments of the sodium-tin coolant compositions only and is not intended to be limiting. It must be noted that, as used in this specification, the singular forms "a," "an," and "the" include plural referents unless the context clearly dictates otherwise. Thus, for example, reference to "a lithium hydroxide" is not to be taken as quantitatively or source limiting, reference to "a step" may include multiple steps, reference to "producing" or "products" of a reaction should not be taken to be all of the products of a reaction, and reference to "reacting" may include reference to one or more of such reaction steps. As such, the step of reacting can include multiple or repeated reaction of similar materials to produce identified reaction products.

Sodium-tin compositions have been identified and created that exhibit better reactivity characteristics (i.e., are less reactive) than sodium metal under the same conditions, making these compositions safer alternatives to sodium metal for use as a coolant. These compositions include compositions having at least 90% sodium (Na), from 0-10% lead (Pb) and the balance being tin (Sn). Unless stated otherwise, all % in the composition descriptions are mol %.

Analytical evaluation of Na—Pb—Sn alloy compositions determined that alloys having at least 90% sodium (Na), at least some (0.01-10%) tin (Sn), and from 0-10% lead (Pb) may have better reactivity characteristics than sodium while still being effective heat transfer fluids suitable for use as a liquid coolant. The analytical investigation involved the creation of custom solution databases based on available binary phase diagrams used with CALPHAD methods to estimate the ternary phase diagrams, and identify compositions with low melting points.

Based on the results of the modeling efforts and supported by the analysis provided below, it was determined that Na—Pb—Sn alloy compositions having at least 90% sodium (Na), at least some (0.01-10%) tin (Sn), and from 0-10% lead (Pb) are suitable coolants. In particular, coolants having from 90%-99.5% Na should be suitable. Some examples of embodiments of Na—Pb—Sn coolants include:

92.5-99.5 mol % Na; 0-7.5 mol % Pb; and 0.001-7.5 mol % Sn.

94.5-95.5 mol % Na; 2.5 mol %-3.5 mol % Pb; and the balance being Sn.

95 mol % Na; 3 mol % Pb; and the balance being Sn.

97.5-98.5 mol % Na; 0.6-1.6 mol % Pb; and the balance being Sn.

98 mol % Na; 1.1 mol % Pb; and the balance being Sn.

96.5-97.5 mol % Na; and the balance being Sn.

97 mol % Na; and the balance being Sn.

Another way of describing the Na—Pb—Sn alloy compositions is they are compositions consisting of sodium and tin that support a continuous reaction with air at temperature higher than that which pure sodium supports a continuous reaction with air. Alternatively, the Na—Pb—Sn alloy compositions are compositions consisting of sodium, lead and tin that support a continuous reaction with air at temperature higher than that which pure sodium supports a continuous reaction with air. Yet another description of the Na—Pb—Sn alloy compositions is that they are compositions consisting essentially of sodium and tin or sodium, lead, and tin that support a continuous reaction with air at temperature higher than that which pure sodium supports a continuous reaction with air.

Figure 1:
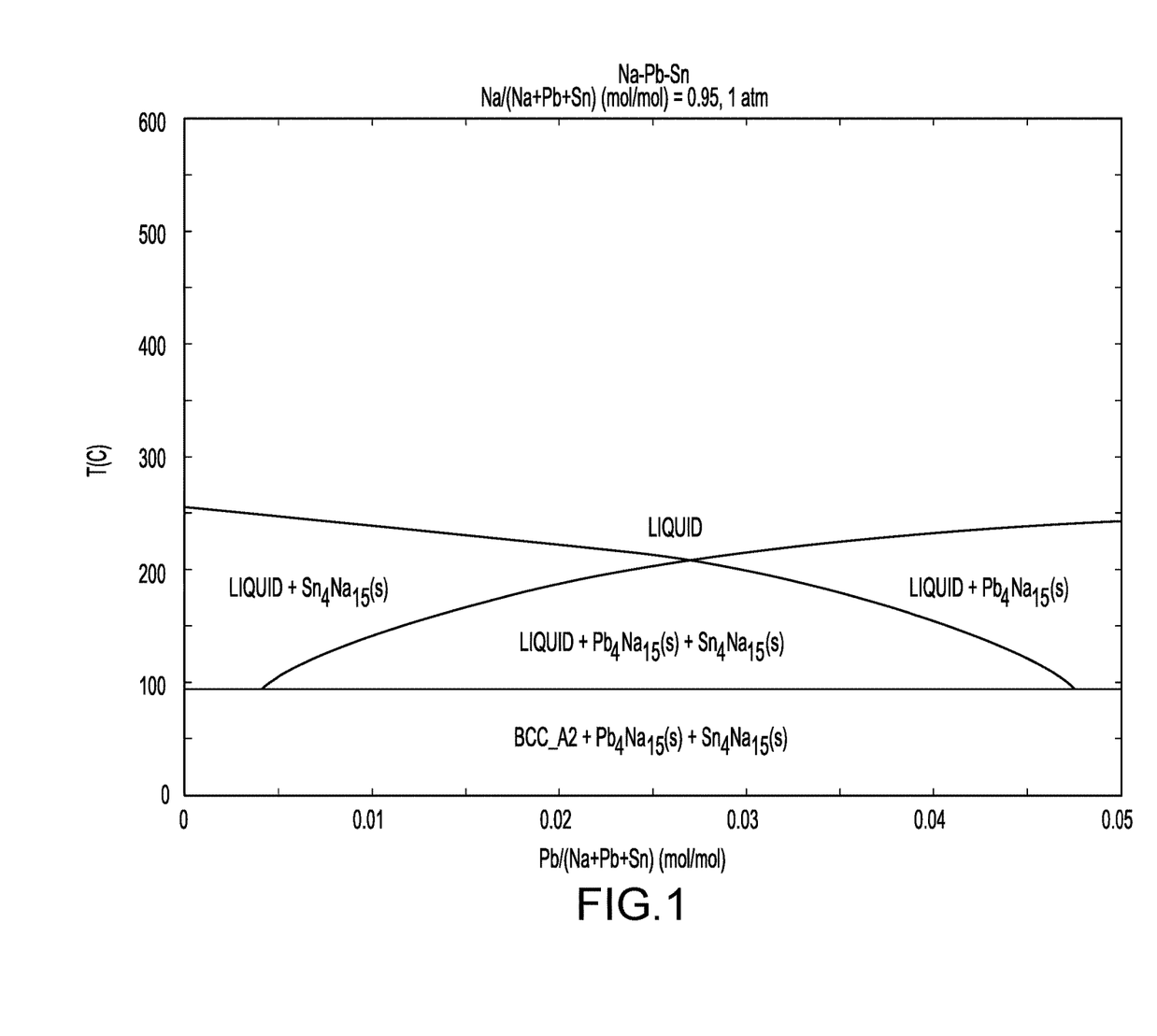
FIG. 1 provides the results of modeling of the ternary phase diagram for 95 mol % Na with the balance being Pb and Sn.

FIG. 1 provides the results of modeling of the ternary phase diagram for 95 mol % Na with the balance being Pb and Sn. The diagram shows the phase change as the Pb fraction increases from 0% to 5% Pb, the balance being Sn (that is, Pb+Sn=5 mol %: for example when Pb=1.5%, Sn=3.5%).

Figure 2:
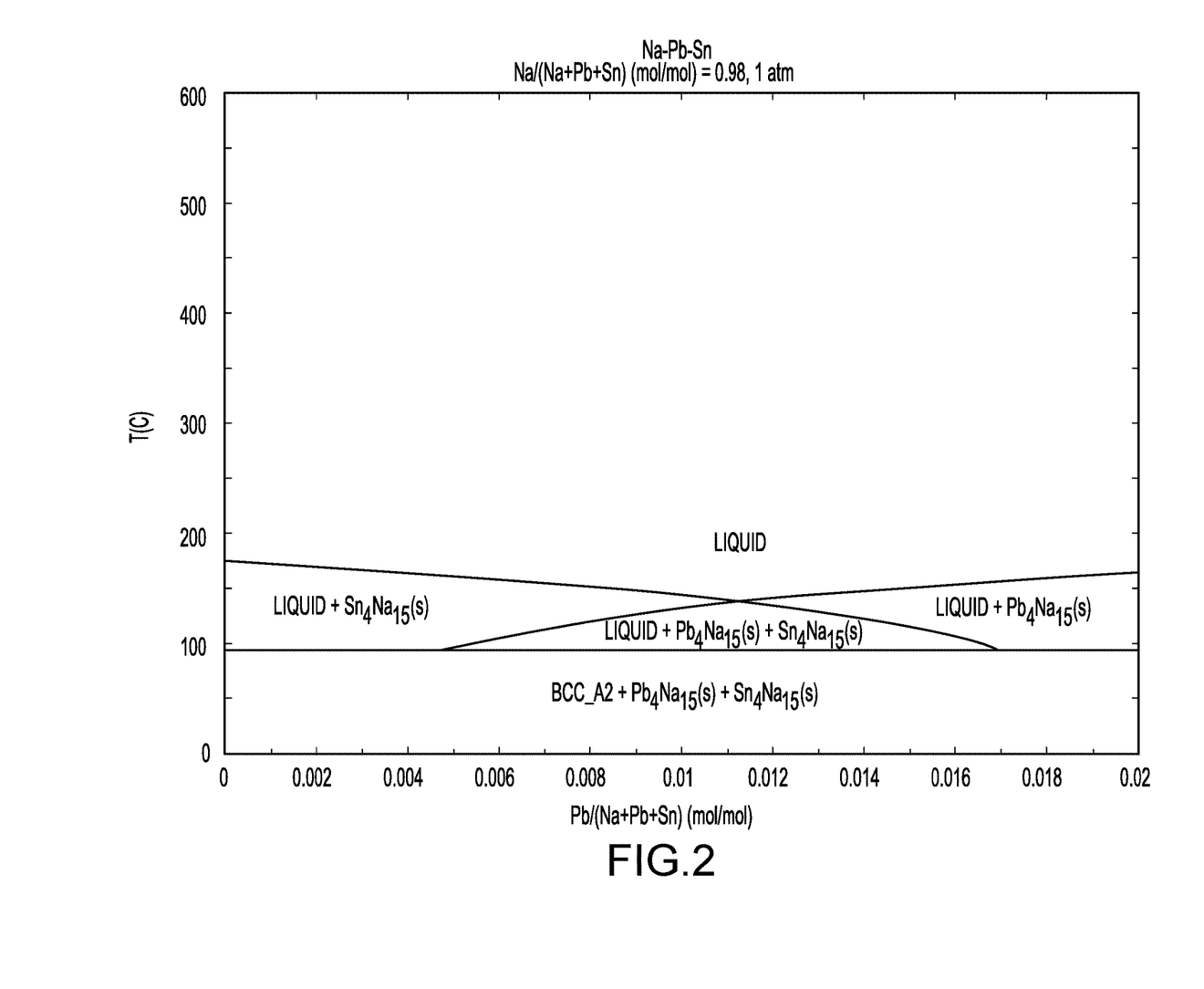
FIG. 2 provides the results of modeling of the ternary phase diagram for 98 mol % Na with the balance being Pb and Sn.

FIG. 2 provides the results of modeling of the ternary phase diagram for 98 mol % Na with the balance being Pb and Sn.

To evaluate and compare the reactivity of sodium-tin compositions against sodium metal, a test apparatus and procedure was created to simulate the exposure of molten liquids to air at high temperatures and determine at what temperature the exposed molten liquid began to react (intermittent flames observed) and at what temperature the liquid sustained a continuous reaction (burned continuously until smothered by the researcher). This test protocol is provided below.

Table 1 shows a summary of results of the experiments using this testing system and protocol described below for different compositions and pure sodium metal reporting the temperature of the first observed reaction and the temperature at which the composition supported a continuous reaction.

| Composition | Temperature of first observed reaction (° C.) | Temperature of continuous reaction (° C.) |
|---|---|---|
| Na | 270 | 270 |
| Na—3Pb—2Sn | 270 | 560 |
| Na—1.1Pb—0.9Sn | 285 | 285 |
| Na—1Sn | 320 | 350 |
| Na—3Sn | 360 | 450 |
| Na—3Pb | 265 | 290 |
| Na—1Pb | 290 | 300 |

Figure 3A:
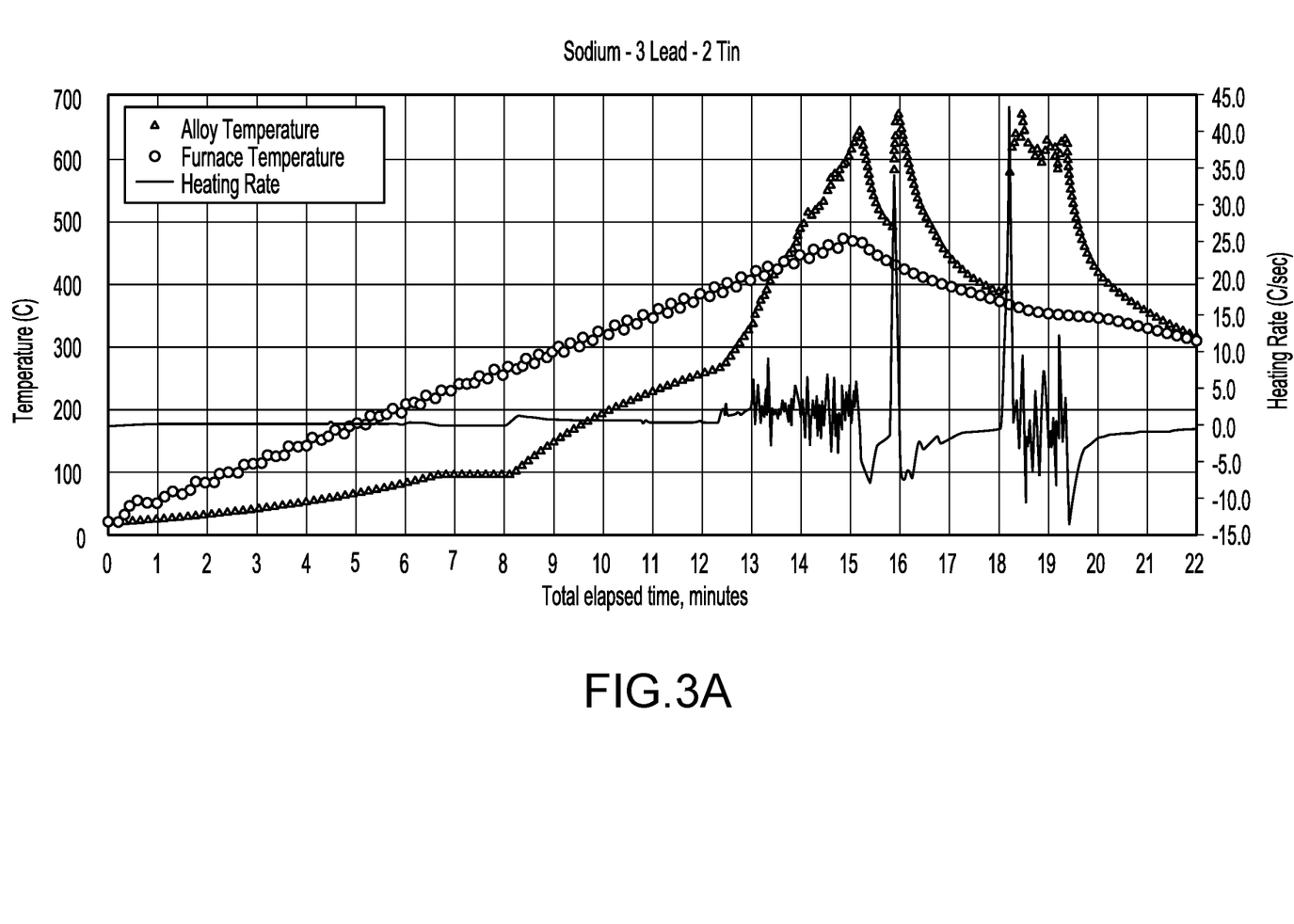
FIGS. 3A and 3B provide graphs of the data taken during the experiment performed on the Na-3Pb-2Sn.
Figure 3B:
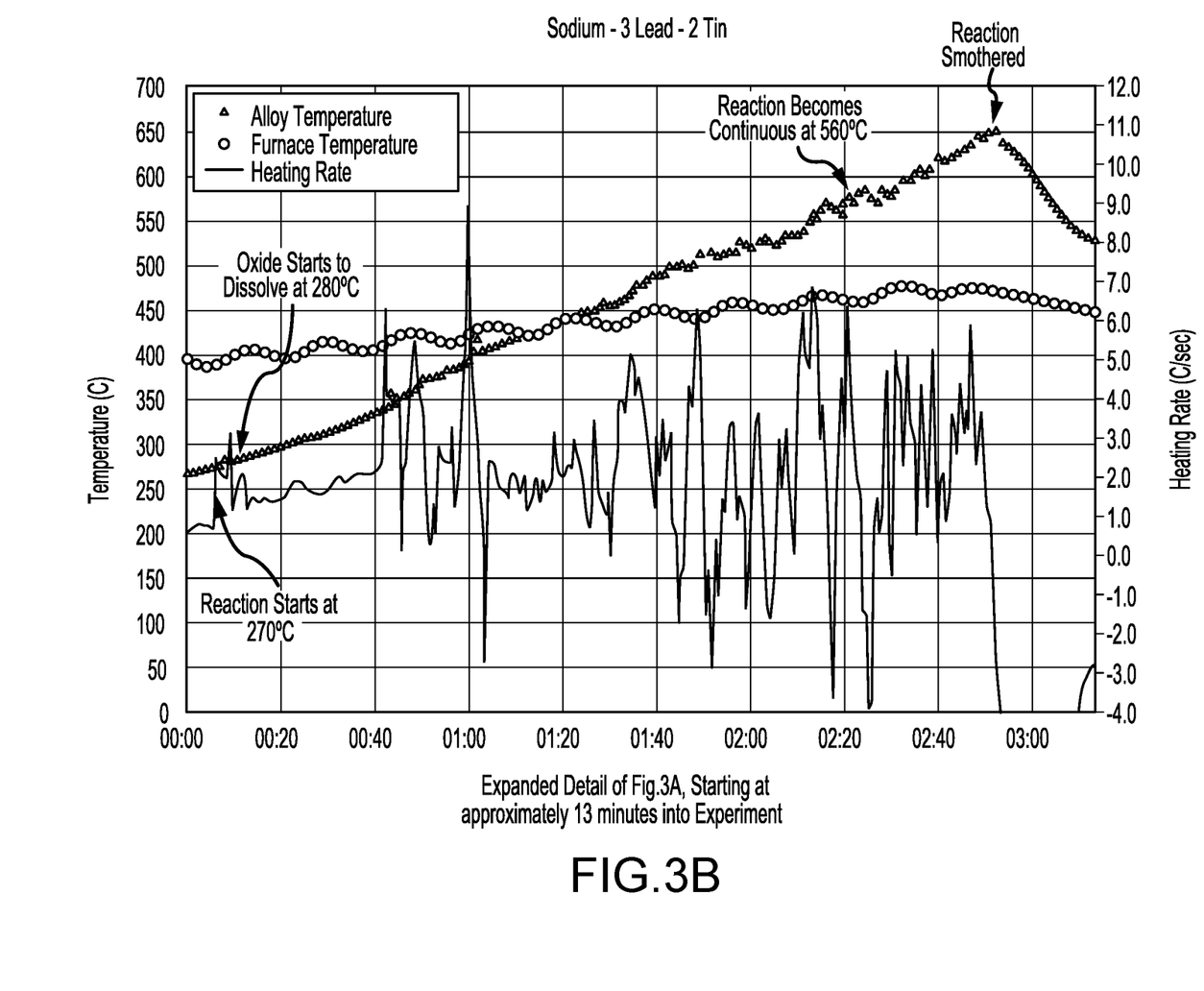

FIGS. 3A and 3B provide graphs of the data taken during the experiment performed on the Na-3Pb-2Sn. The graphs show the temperatures of the furnace and the composition (identified as "Alloy Temperature" in the FIGS.) through the experiment. The heating rate is also shown. As described below in the protocol, the furnace holding the alloy was heated and the alloy was observed. To ensure a stable protective film does not artificially inflate the ignition point, a dry air stream from the house compressor system injected directly into the melt was used. Where possible the dissolution of the oxide was noted, the first evidence of flame (first observed reaction) was noted, and the continuous reaction was noted by direct observation of the alloy in the furnace. These observations are shown in the graph and correlate with observed temperatures. FIG. 3A is a graph of the entire experiment while FIG. 3B is a detail showing the noteworthy events (i.e., oxide dissolution, first observed reaction and continuous reaction).

Figure 4A:
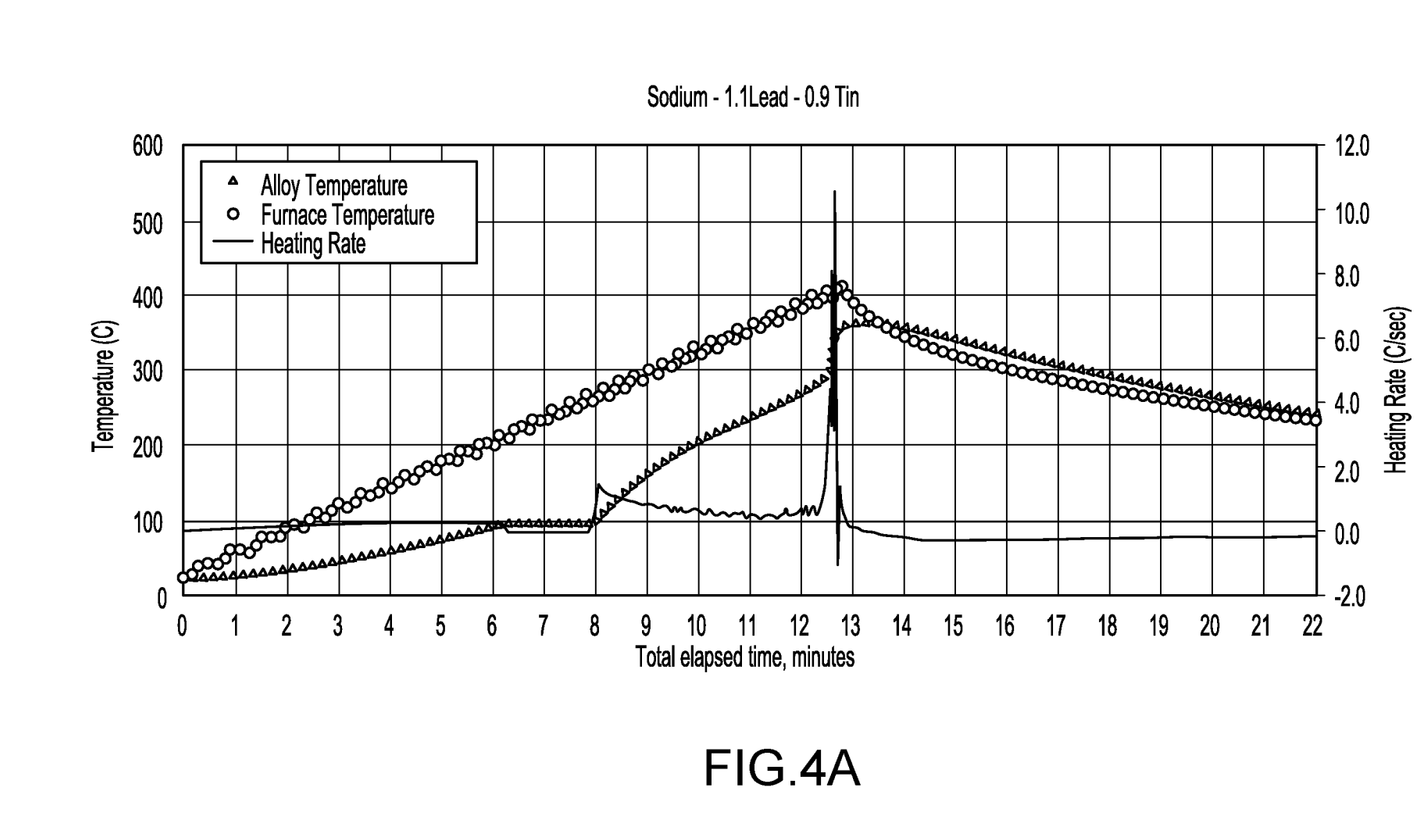
FIGS. 4A and 4B provide graphs of the data taken during the experiment performed on the Na-1.1Pb-0.9Sn.
Figure 4B:
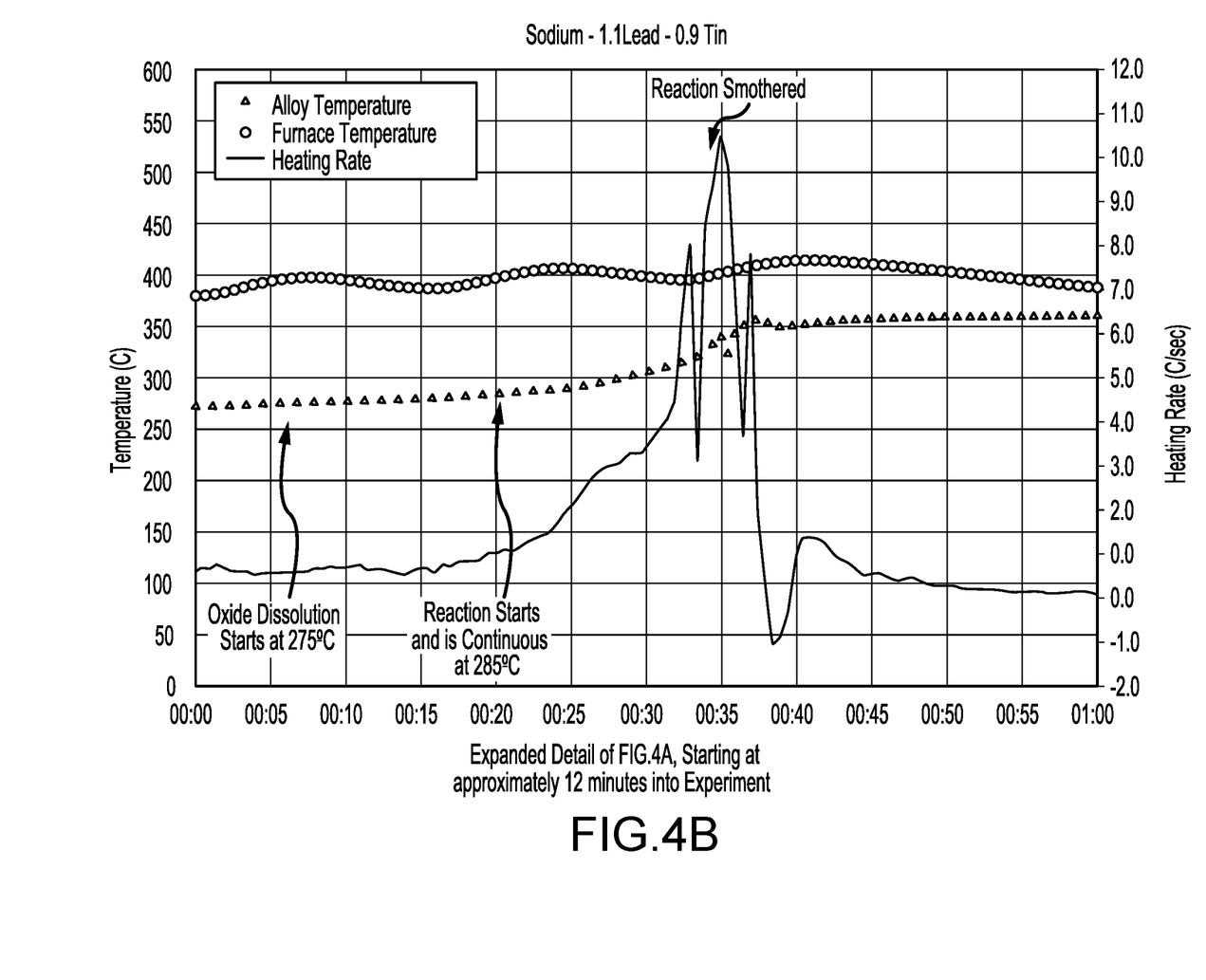

FIGS. 4A and 4B provide graphs of the data taken during the experiment performed on the Na-1.1Pb-0.9Sn. Again, FIG. 4A is a graph of the entire experiment while FIG. 4B is a detail showing the noteworthy events (i.e., oxide dissolution, first observed reaction and continuous reaction).

Figure 5A:
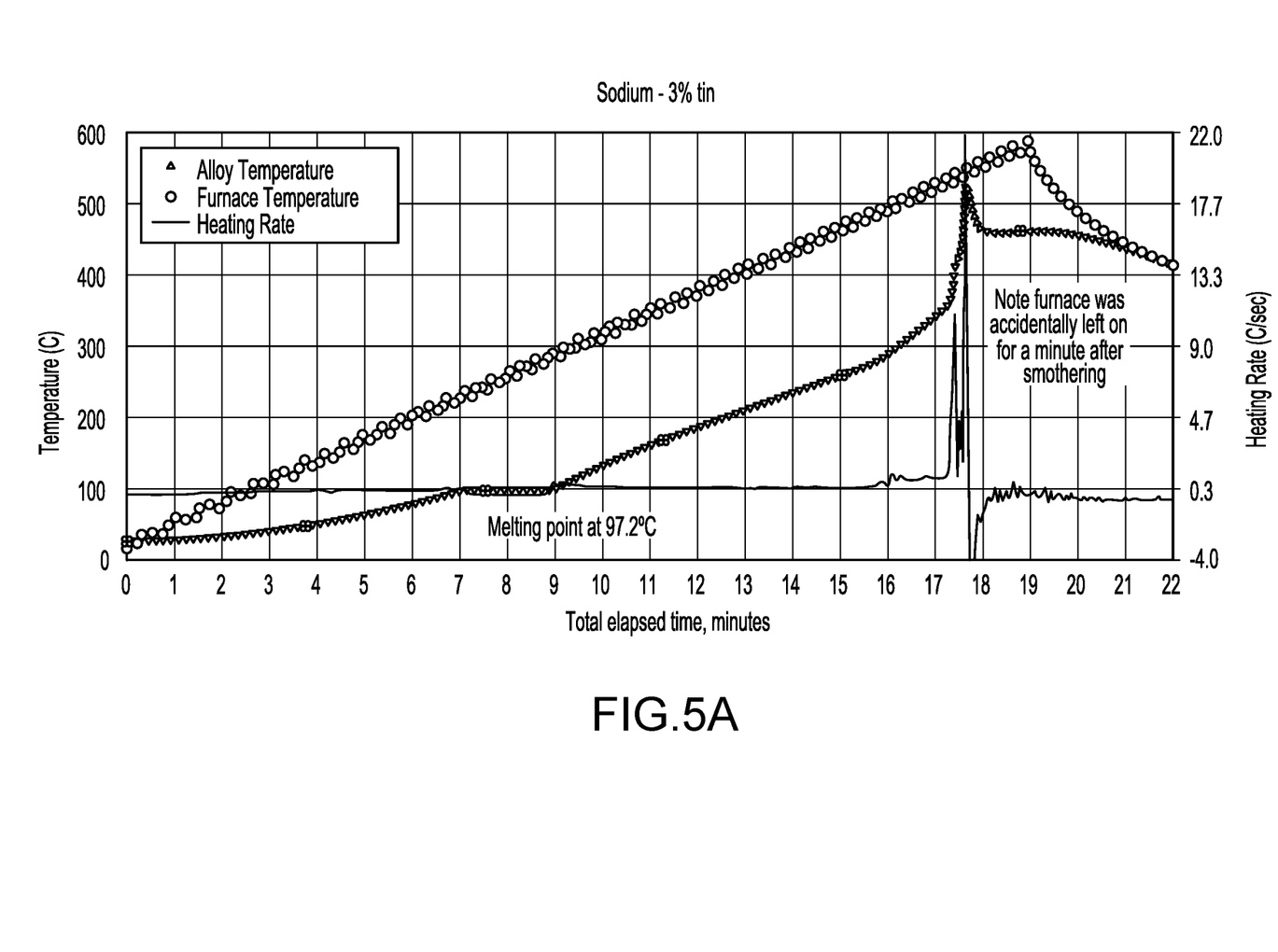
FIGS. 5A and 5B provide graphs of the data taken during the experiment performed on the Na-3Sn.
Figure 5B:
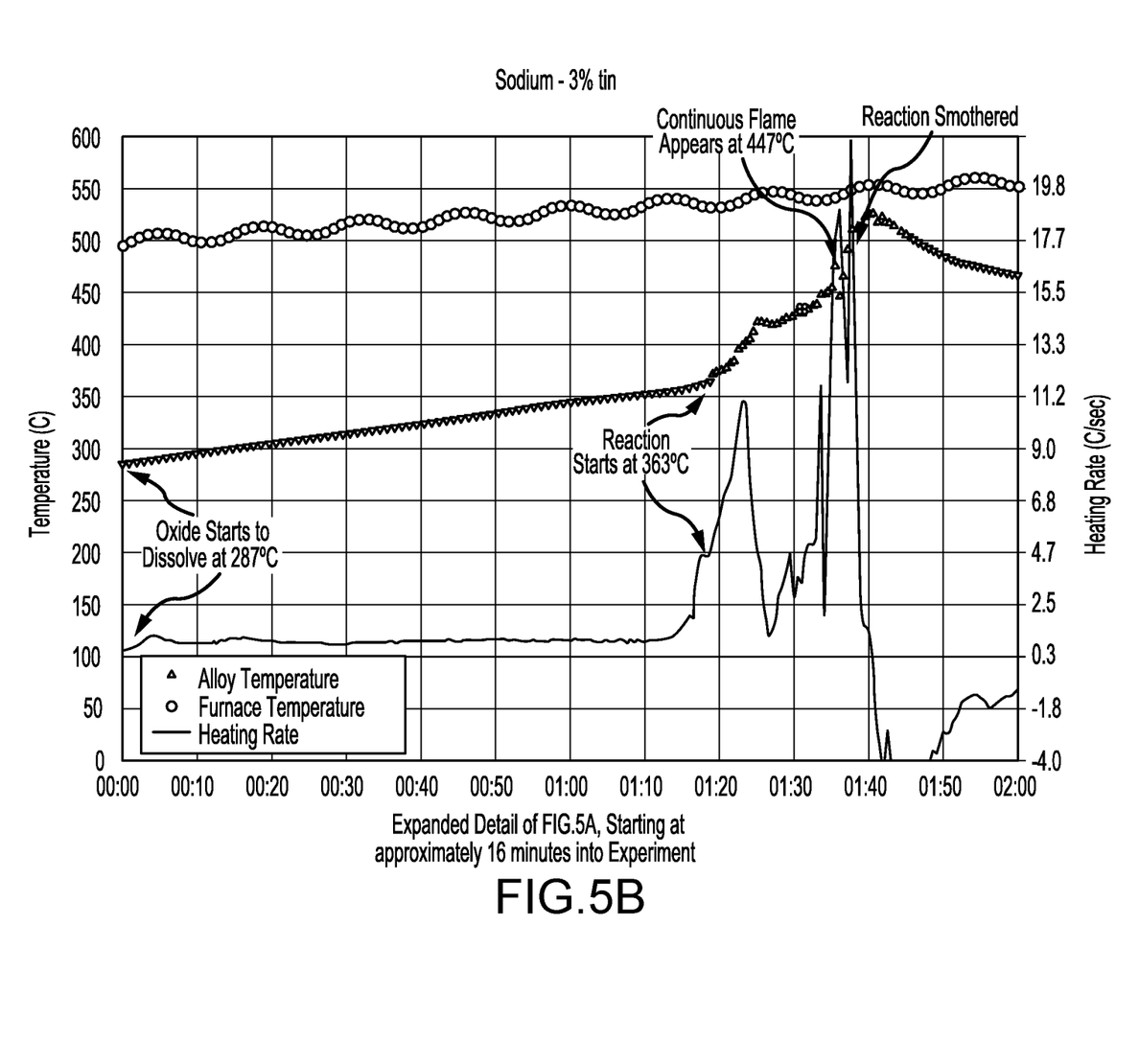

FIGS. 5A and 5B provide graphs of the data taken during the experiment performed on the Na-3Sn. Again, FIG. 5A is a graph of the entire experiment while FIG. 5B is a detail showing the noteworthy events.

Figure 10A:
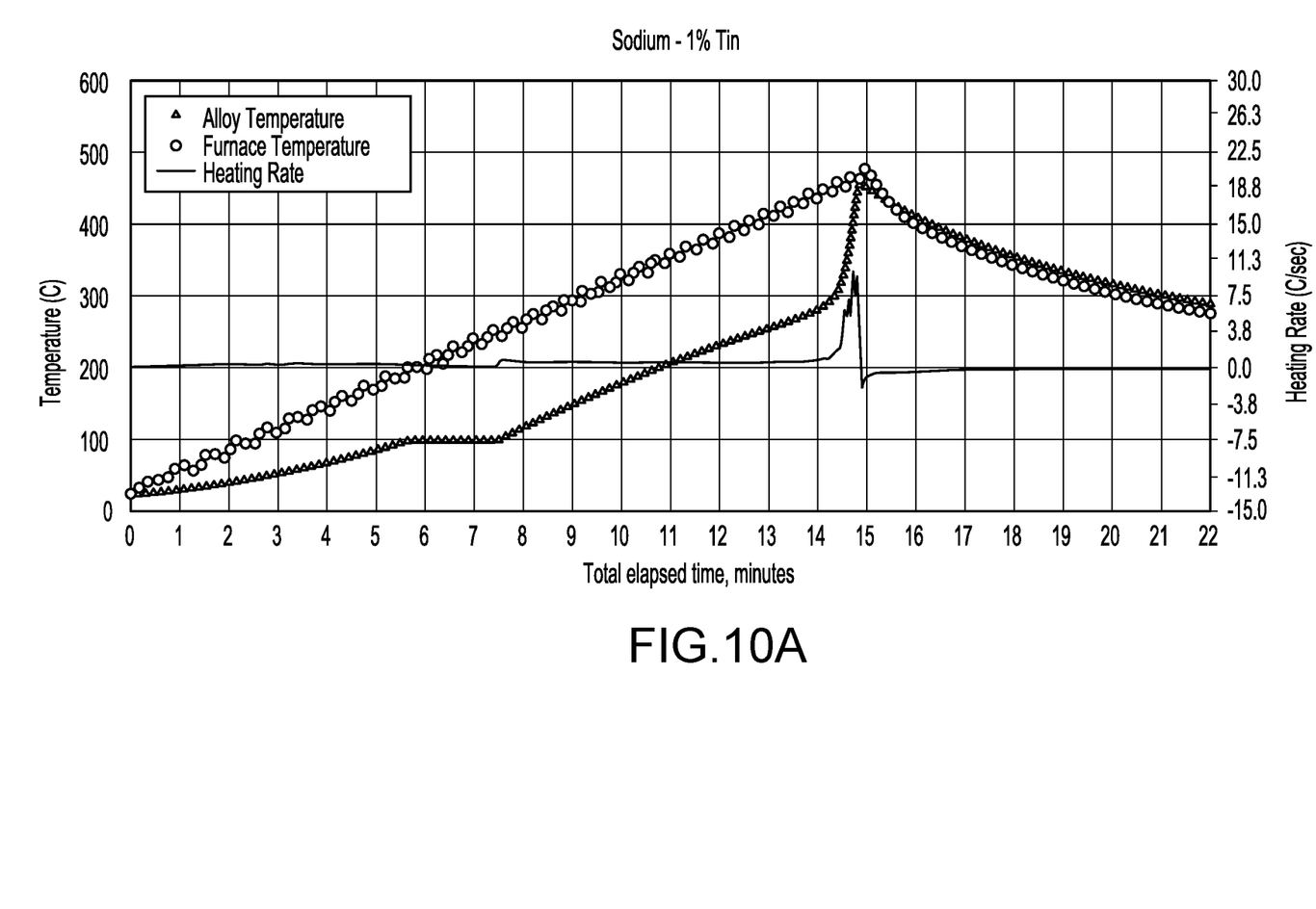
FIGS. 10A and 10B provide graphs of the data taken during the experiment performed on the Na-1Sn.
Figure 10B:
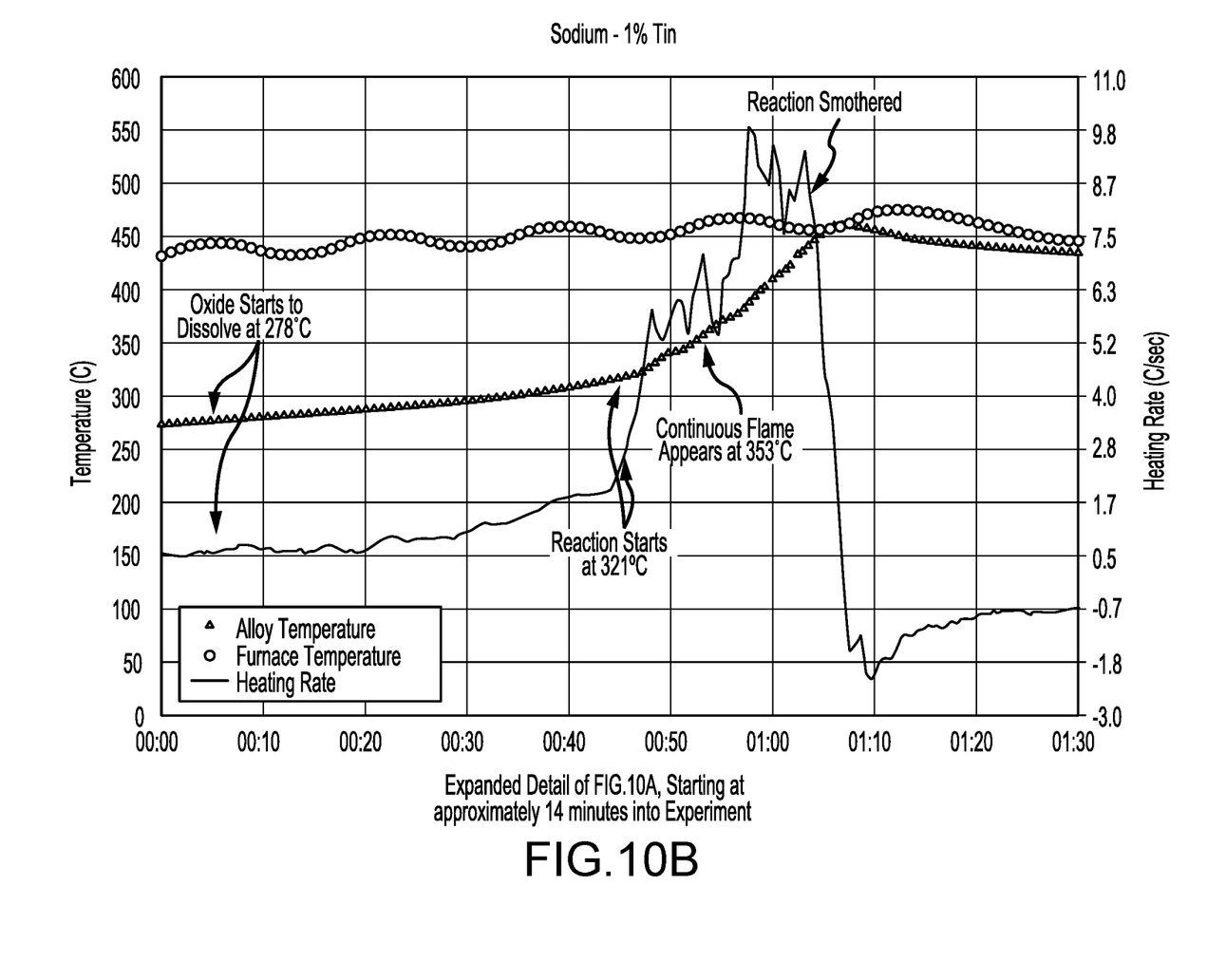

FIGS. 10A and 10B provide graphs of the data taken during the experiment performed on the Na-1Sn. Again, FIG. 10A is a graph of the entire experiment while FIG. 10B is a detail showing the noteworthy events.

Figure 6:
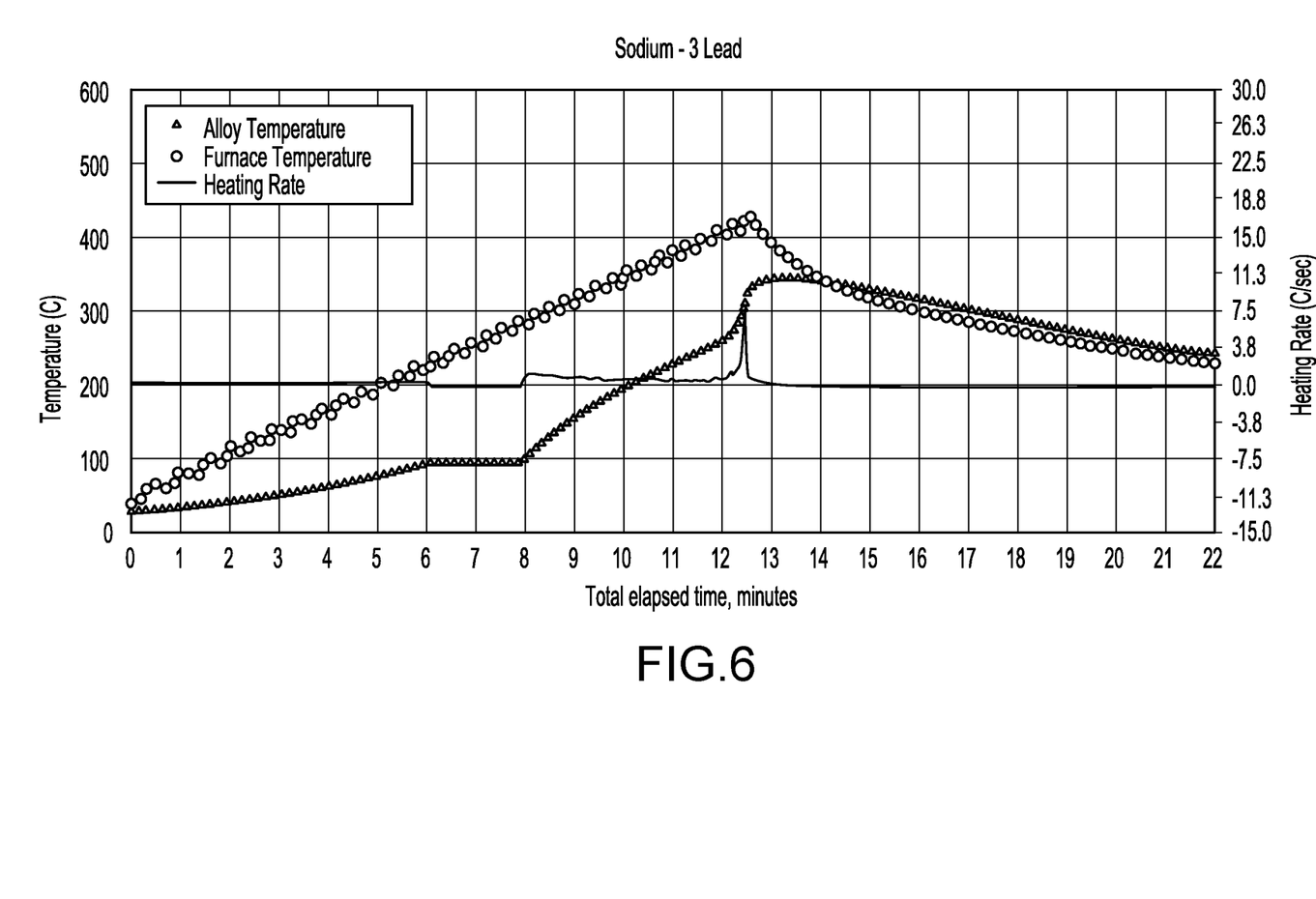
FIG. 6 is a graph of the data taken during the experiment performed on the Na-3Pb.

FIG. 6 is a graph of the data taken during the experiment performed on the Na-3Pb.

Figure 7:
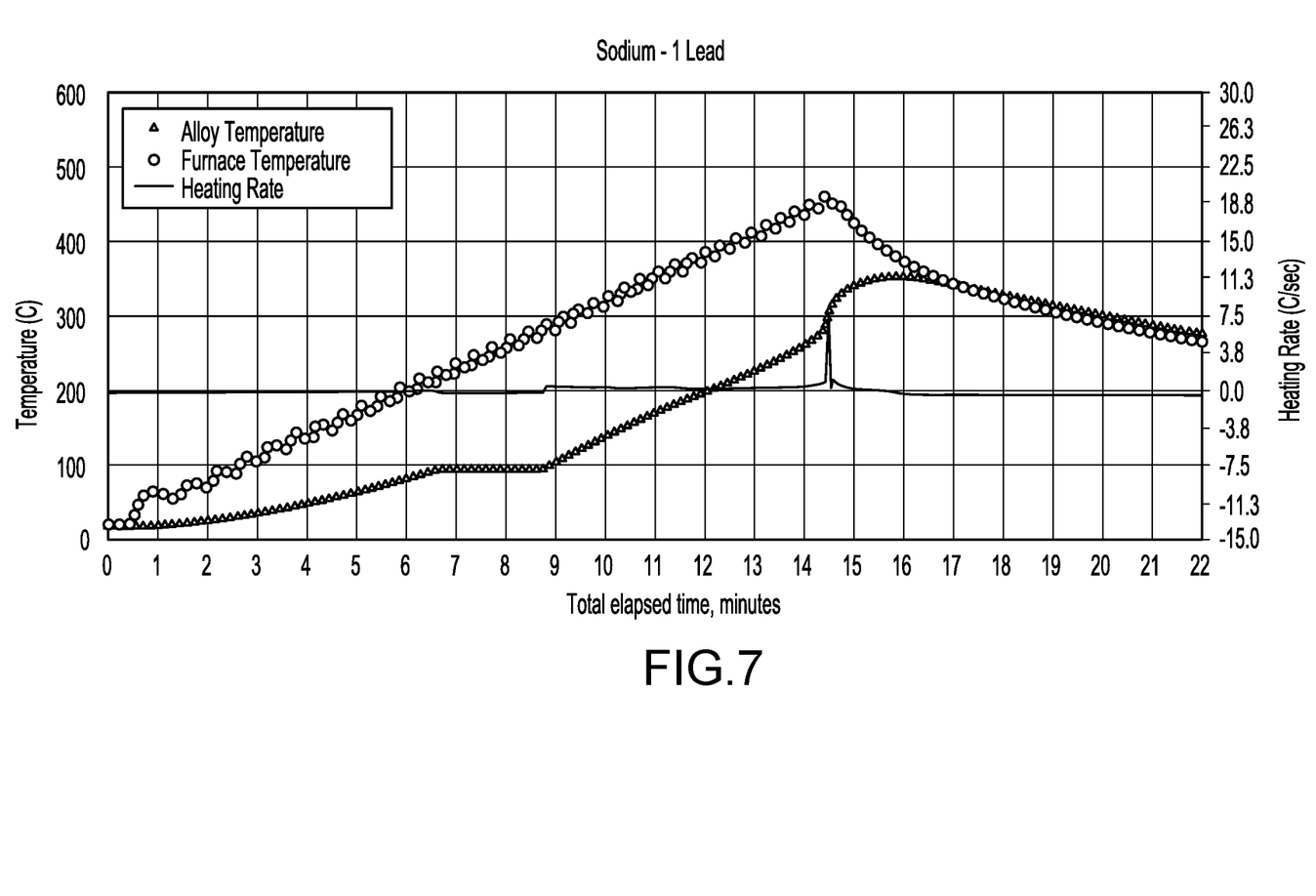
FIG. 7 is a graph of the data taken during the experiment performed on the Na-1Pb.

FIG. 7 is a graph of the data taken during the experiment performed on the Na-1Pb.

Figure 8:
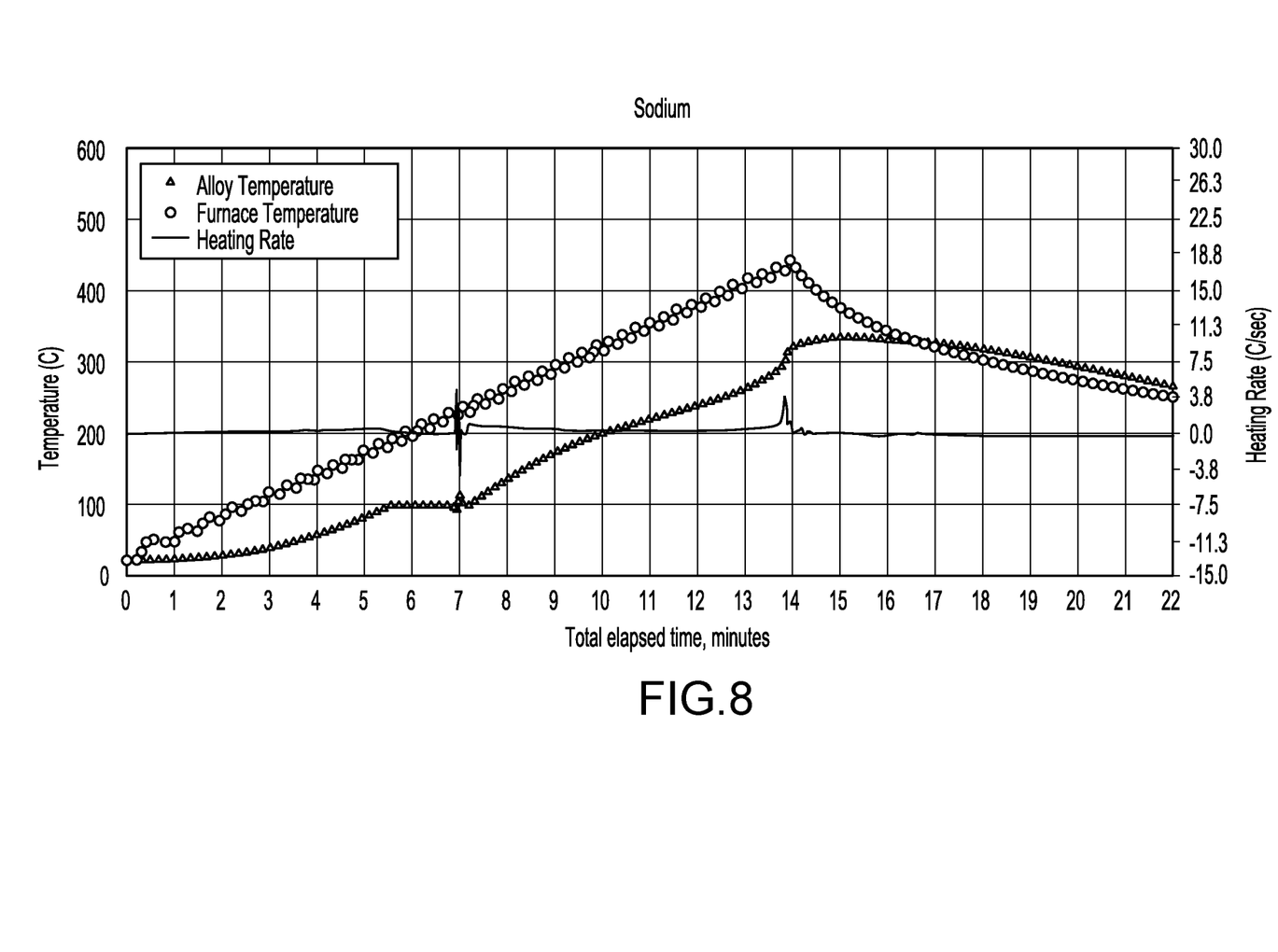
FIG. 8 is a graph of the performance of pure sodium for comparison to the alloy compositions above.

FIG. 8 is a graph of the performance of pure sodium for comparison to the alloy compositions above.

Figure 9:
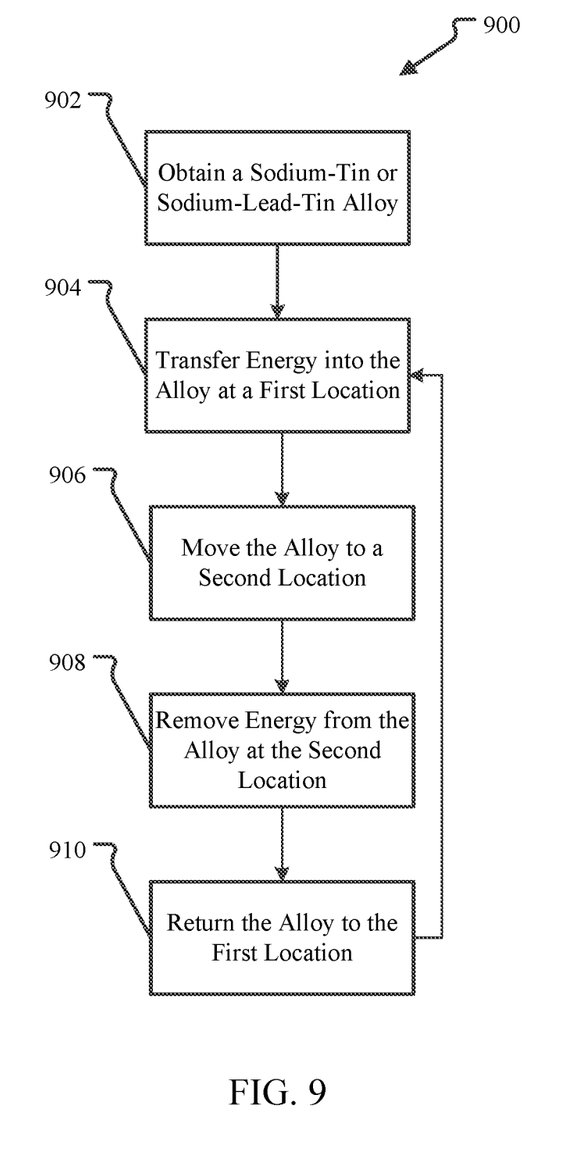
FIG. 9 is a flow diagram for a simple method of using the sodium-tin and sodium-lead-tin compositions described above as coolants.

FIG. 9 is a flow diagram for a simple method of using the sodium-tin and sodium-lead-tin compositions described above as coolants in an industrial process. The sodium-tin and sodium-lead-tin compositions are suitable for use in any industrial process that may use sodium as a heat transfer fluid. Examples of such industrial processes that could use the sodium-tin and sodium-lead-tin compositions include nuclear reactors and solar thermal collection systems such as a concentrated solar power system.

As shown in FIG. 9, any of the sodium-tin or sodium-lead-tin compositions as described above may be used. The composition is obtained as illustrated by the obtaining operation 902. Energy from the industrial process to be cooled is then transferred to the composition in a heating operation 904. The heating operation 904 may include passing the composition through a heat exchanger to receive energy from another heat transfer fluid or over some surface heated by the industrial process.

In the embodiment shown, the heated composition is then moved to a second location in moving operation 906 where the thermal energy stored in the composition is removed in a cooling operation 908.

A heat transfer loop may be created, as shown in FIG. 9, by returning the coolant exiting the cooling operation 908 to the location where the heating operation 904 is performed, as illustrated by the returning operation 910. In an embodiment, the equipment of the heating operation 904 may be in one location, e.g., within a nuclear reactor core or a receiver of a concentrated solar power system, and the equipment of the cooling operation 908 may be at a second location different from the first, e.g., outside of the reactor core. In an alternative embodiment, not shown, the compositions described above may be used as an energy storage medium in which an amount of a sodium-tin or sodium-lead-tin composition is heated in place and the thermal energy is later removed without physically moving the composition. The use of liquid coolants and liquid thermal energy storage materials is well known in the art and the sodium-tin and sodium-lead-tin compositions described above are suitable for any such known uses.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained.

Auto-Ignition Test Protocol

Alloy Preparation and Melting Point

The alloy melting point was determined during the mixing step. All mixing was conducted in an inert glove box. The individual elements were weighed out and placed in a stainless steel crucible that had been instrumented with a bare wire thermocouple to ensure the alloy surface temperature was measured. The alloy was melted on a stirred hot plate. Additional agitation may have been provided using a stainless steel stir stick. The alloy was melted and solidified twice to allow for homogenization. During the cycling, the temperature of the melt was continuously recorded. The melting/solidification point was manifest as an inflection on the heating and cooling curve. In addition, the alloy could be observed visually when the melting became apparent. This provided an approximate melting point.

Auto Ignition Testing

Auto ignition testing was determined using the alloy mixed in the stainless steel crucible. The crucible was heated inside a micro-furnace (a vertical tube with a sealed bottom which was heated using a cable heater). The micro-furnace acted as primary containment in the case of a leak. The micro-furnace was located in a stainless steel beaker which was inerted and acted as a secondary containment. Sodium auto ignition temperature is a relative term that depends on many conditions including oxygen content of the gas, gas flow rate, sodium surface condition (oxidized versus clean), heat loss in the sodium, etc. As such the temperature was reported to range from 115° C. up to 400° C. or greater. Therefore, this test was considered relative and as such a pure sodium sample had to be tested first to establish a baseline.

To ensure a stable protective film did not artificially inflate the ignition point, a dry air stream from the house compressor system either impinging on the alloy surface or injected directly into the melt was used. In these experiments, the air stream was injected into the bottom of the melted alloy allowing the alloy to bubble to prevent formation of a protective film. For injection, the airflow was 0.5 slm. The furnace heating rate was set at 30° C./min.

To conduct the experiment, the crucible with the alloy was placed in the micro-furnace and the supporting stainless steel beaker was flooded with argon at approximately 5 slm. The power to the heater was turned on. At a 50° C., the airstream impingement was turned on. The crucible temperature was monitored using the instrumented thermocouple and using visual observation. A video recording of the alloy surface in the crucible and temperature was made to aid in documenting the transition points. The alloy was observed for the start of smoke/reaction and the start of continuous flame, the temperature at which these phenomena were observed was recorded. Once flames had been observed, the crucible was smothered with a refractory blanket, the air and power were shut off. The argon remained on and the test was allowed to cool. If no smoke or flames appeared by 600° C., the alloy was held at 600° C. for two minutes. After which the air and power were shut off (argon remained on) and allowed to cool.

Test Procedure

Alloy Preparation and Melting Point

1. Using weighing trays, the required amount of sodium and additive per prescribed test was measured out. Actual weight had to be within 2% of target value. Recorded target and actual weights in a lab notebook.
2. Placed instrumented crucible in the holder on a hot plate. Attached the thermocouple to the readout cable. Ensured the crucible was standing upright.
3. Placed the sodium pieces and additives into the crucible.
4. Started data logger.
5. Turned on hotplate. Set temperature to 500° C. and stirrer to 350 rpm.
6. Observed melting. If pieces of metal were stuck on the thermocouple wire, they may have needed to be pushed in. Once melted, the liquid metal was carefully stirred with a metal stir rod.
7. Once alloy reached at least 300° C., the hot plate was turned off and the alloy was allowed to cool on hot plate. Once completely frozen, turned off data logger.
8. Remelted alloy. Turned on data logger. Turned on hotplate. Set temperature to 500° C. and stirrer to 350 rpm. Note: This could have been done immediately after the prior step or at a later time.
9. Once alloy reached at least 300° C., turned off hot plate. Moved crucible with thermocouple attached to the cooling stand and allowed to cool. Once completely frozen, turned off data logger.
10. Once crucible and alloy were below 30° C., the alloy could be moved to storage or to testing.

Auto-Ignition Testing

1. Ensured data logging computer was operational and created an appropriate file name for the test being performed.
2. Ensured the temperature controller had an upper set point of 700° C. and the ramp rate was set to 30° C./min.
3. Installed an air nozzle on the airline.
4. Opened air flow bypass valve. Turned on air supply and set air flow controller to 0.5 slm for injected air. Recorded test type in lab notebook.
5. Ensured the argon line was in the furnace revetment and flowed argon at approximately 5 slm.
6. Placed the crucible located in the glovebox in the transfer can and passed the can through the antichamber.
7. Brought the can to the fume hood, opened and moved the crucible to the furnace.
8. Positioned the air nozzle in the crucible for injection testing. If the metal was solid, the nozzle rested on the metal surface and was weighted. If the metal was liquid, the nozzle was inserted directly into the metal.
9. Ensured the fume hood sash was closed to a 4-8 inch gap (just enough for a gloved hand to pass through and reach the furnace).
10. Focused the camera on the alloy surface.
11. Started recording on the camera and the data file at the same time.
12. Started the heater cycle.
13. Observed the metal surface for oxide dissolution, smoking/start of reaction and/or continuous flame. Noted the approximate temperatures at which these occurred.
14. Immediately after a continuous flame was observed, completed the following sequence in order:
    a. Opened the air bypass valve to stop airflow to the melt.
    b. Placed the refractory blanket over the top of the stainless steel beaker.
    c. Stopped the heater.
    d. Closed the air valve leading to the melt.
    e. If melt temperature was still rising at an accelerating rate and smoke was observed, repositioned the refractory blanket to create a better seal.
    f. Stopped recording on the camera.
    g. Recorded the temperature values observed in the lab notebook.

15. Observed the test as it cooled. Once it became clear that the reaction had stopped and the melt temperature was dropping at a steady rate, the second operator could be dismissed.

In addition to those described above, further embodiments are disclosed in the following numbered clauses:

1. A composition consisting of or consisting essentially of:
   90-99.9 mol % sodium (Na);
   0-10 mol % lead (Pb); and
   the balance being tin (Sn).

2. The composition of clause 1, wherein the composition is:
   92.5-99.5 mol % Na;
   0-7.5 mol % Pb; and
   0.001-7.5 mol % Sn.

3. The composition of clause 1, wherein the composition is:
   94.5-95.5 mol % Na;
   2.5 mol %-3.5 mol % Pb; and
   the balance being Sn.

4. The composition of clause 3, wherein the composition is:
   95 mol % Na;
   3 mol % Pb; and
   the balance being Sn.

5. The composition of clause 1, wherein the composition is:
   97.5-98.5 mol % Na;
   0.6-1.6 mol % Pb; and
   the balance being Sn.

6. The composition of clause 1, wherein the composition is:
   96.5-97.5 mol % Na; and
   the balance being Sn.

7. The composition of clause 6, wherein the composition is:
   97 mol % Na; and
   the balance being Sn.

8. A composition consisting of sodium and tin that supports a continuous reaction with air at temperature higher than that which pure sodium supports a continuous reaction with air.

9. A composition consisting of sodium, lead and tin that supports a continuous reaction with air at temperature higher than that which pure sodium supports a continuous reaction with air.

10. A composition consisting essentially of sodium and tin that supports a continuous reaction with air at temperature higher than that which pure sodium supports a continuous reaction with air.

11. A composition consisting essentially of sodium, lead and tin that supports a continuous reaction with air at temperature higher than that which pure sodium supports a continuous reaction with air.

12. A method for cooling an industrial process comprising:
   obtaining a composition of any one of clauses 1-11;
   heating the composition at a first location, thereby creating a heated composition;
   moving the heated composition from the first location to a second location; and
   removing at least some energy from the composition at the second location, thereby reducing its temperature and created a cooled composition.

13. The method of clause 12 further comprising:
   returning the cooled composition to the first location.

14. The method of clause 12 further comprising:
   repeating the heating, moving, removing and returning operations.

15. The method of clause 12 wherein the industrial process is a nuclear reactor and the first location is within the reactor core.

16. The method of clause 12 wherein the industrial process is a solar thermal collector system and the first location is a receiver location.

17. The method of any one of clause 12-16 wherein the composition is 90-99.9 mol % sodium (Na), 0-10 mol % lead (Pb) and the balance being tin (Sn).

18. A composition of any of clauses 1-7, wherein the composition supports a continuous reaction with air at temperature higher than that which pure sodium supports a continuous reaction with air.

19. A composition of any of clauses 1-7, wherein the composition supports a continuous reaction with air at temperature higher than that which pure sodium supports a continuous reaction with air.

20. A composition of any of clauses 1-7, wherein the composition supports a continuous reaction with air at temperature higher than that which pure sodium supports a continuous reaction with air.

21. A composition of any of clauses 1-7, wherein the composition supports a continuous reaction with air at temperature higher than that which pure sodium supports a continuous reaction with air.

22. A composition consisting of or consisting essentially of:
   90-99.9 mol % sodium (Na);
   0.01-10 mol % lead (Pb); and
   the balance being tin (Sn).

23. The composition of clause 22, wherein the composition is:
   92.5-99.5 mol % Na;
   0.01-7.5 mol % Pb; and
   0.001-7.5 mol % Sn.

Notwithstanding that the numerical ranges and parameters setting forth the broad scope of the technology are approximations, the numerical values set forth in the specific examples are reported as precisely as possible. Any numerical value, however, inherently contain certain errors necessarily resulting from the standard deviation found in their respective testing measurements.

It will be clear that the systems and methods described herein are well adapted to attain the ends and advantages mentioned as well as those inherent therein. Those skilled in the art will recognize that the methods and systems within this specification may be implemented in many manners and as such are not to be limited by the foregoing exemplified embodiments and examples. In other words, functional elements being performed by a single or multiple components, in various combinations of hardware and software, and individual functions can be distributed among software applications at either the client or server level. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope contemplated by the present disclosure. Numerous other changes may be made which will readily suggest themselves to those skilled in the art and which are encompassed in the spirit of the disclosure. It will be clear that the systems and methods described herein are well adapted to attain the ends and advantages mentioned as well as those inherent therein. Those skilled in the art will recognize that the methods and systems within this specification may be implemented in many manners and as such are not to be limited by the foregoing exemplified embodiments and examples. In this regard, any number of the features of the different embodiments described herein may be combined into one single embodiment and alternate embodiments having fewer than or more than all of the features herein described are possible.

What is claimed is:

1. A composition consisting of:
94.5-95.5 mol % Na;
2.5-3.5 mol % Pb; and
the balance being Sn.

2. The composition of claim 1, wherein the composition is:
95 mol % Na;
3 mol % Pb; and
the balance being Sn.

3. The composition of claim 1 wherein the composition supports a continuous reaction with air at a temperature higher than that which pure sodium supports a continuous reaction with air.

4. The composition of claim 1 wherein the composition supports a continuous reaction with air at a temperature at least about 100% higher than that which pure sodium supports a continuous reaction with air.

* * * * *